United States Patent
Cho et al.

(10) Patent No.: US 7,643,727 B2
(45) Date of Patent: **\*Jan. 5, 2010**

(54) METHOD AND APPARATUS OF RECORDING A MULTI-CHANNEL STREAM, AND A RECORDING MEDIUM CONTAINING A MULTI-CHANNEL STREAM RECORDED BY SAID METHOD

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 734 days.

This patent is subject to a terminal disclaimer.

(21) Appl. No.: 10/201,454

(22) Filed: Jul. 23, 2002

(65) Prior Publication Data

US 2003/0026597 A1 Feb. 6, 2003

(30) Foreign Application Priority Data

Jul. 24, 2001 (KR) ............................... 2001-44387

(51) Int. Cl.
    *H04N 7/52* (2006.01)
(52) U.S. Cl. .......................... 386/95; 386/36; 386/37; 386/92; 386/124; 386/125; 386/126
(58) Field of Classification Search ......... 386/124–126, 386/95, 36–37, 92
    See application file for complete search history.

(56) References Cited

U.S. PATENT DOCUMENTS 5,521,898 A 5/1996 Ogasawara
5,559,808 A 9/1996 Kostreski et al.
5,602,956 A 2/1997 Suzuki et al.

(Continued)

FOREIGN PATENT DOCUMENTS

CN 1134583 10/1996

(Continued)

OTHER PUBLICATIONS

U.S. Office Action issued Jul. 25, 2008.

(Continued)

*Primary Examiner*—Thai Tran
*Assistant Examiner*—Helen Shibru
(74) *Attorney, Agent, or Firm*—Harness, Dickey & Pierce, PLC

(57) ABSTRACT

The present invention relates to method and apparatus of recording a multi-channel data stream on a recording medium in such a manner that substreams of digital channels constituting the multi-channel data stream can be distinguished each other in reproduction. The present recording method separates a multi-channel stream composed of substreams belonging to a plurality of channels into individual substreams, records the individual substreams separately by channel in a single or plural stream objects allocated in a recording medium, and creates as many files as the number of channels for the single or plural stream objects. The present method makes it possible to selectively search and reproduce each substream among a recorded multi-channel stream through file selection, thereby improving use convenience of a recording machine such as a digital video recorder.

12 Claims, 8 Drawing Sheets

U.S. PATENT DOCUMENTS

| | | | |
|---|---|---|---|
| 5,651,010 A | 7/1997 | Kostreski et al. | |
| 5,729,549 A | 3/1998 | Kostreski et al. | |
| 5,732,185 A | 3/1998 | Hirayama et al. | |
| 5,742,569 A | 4/1998 | Yamamoto et al. | |
| 5,747,136 A | 5/1998 | Shono et al. | |
| 5,771,334 A | 6/1998 | Yamauchi et al. | |
| 5,784,528 A | 7/1998 | Yamane et al. | |
| 5,819,003 A | 10/1998 | Hirayama et al. | |
| 5,835,493 A | 11/1998 | Magee et al. | |
| 5,854,873 A | 12/1998 | Mori et al. | |
| 5,870,523 A | 2/1999 | Kikuchi et al. | |
| 5,877,817 A | 3/1999 | Moon | |
| 5,884,004 A | 3/1999 | Sato et al. | |
| 5,909,257 A | 6/1999 | Ohishi et al. | |
| 5,913,010 A | 6/1999 | Kaneshige et al. | |
| 5,940,255 A | 8/1999 | Uwabo et al. | |
| 5,949,792 A | 9/1999 | Yasuda et al. | |
| 5,953,187 A | 9/1999 | Uwabo et al. | |
| 5,966,352 A | 10/1999 | Sawabe et al. | |
| 5,987,126 A | 11/1999 | Okuyama et al. | |
| 5,999,698 A | 12/1999 | Nakai et al. | |
| 6,031,962 A | 2/2000 | Sawabe et al. | |
| 6,035,095 A | 3/2000 | Kaneshige et al. | |
| 6,064,796 A | 5/2000 | Nakamura et al. | |
| 6,067,400 A | 5/2000 | Saeki et al. | |
| 6,167,189 A | 12/2000 | Taira et al. | |
| 6,181,870 B1 | 1/2001 | Okada et al. | |
| 6,181,872 B1* | 1/2001 | Yamane et al. | 386/112 |
| 6,185,365 B1* | 2/2001 | Murase et al. | 386/95 |
| 6,195,726 B1* | 2/2001 | Hogan | 711/112 |
| 6,219,488 B1 | 4/2001 | Mori et al. | |
| 6,222,805 B1 | 4/2001 | Mori et al. | |
| 6,285,825 B1 | 9/2001 | Miwa et al. | |
| 6,321,027 B2 | 11/2001 | Honjo | |
| 6,336,002 B1 | 1/2002 | Yamauchi et al. | |
| 6,343,062 B1 | 1/2002 | Furukawa et al. | |
| 6,351,442 B1 | 2/2002 | Tagawa et al. | |
| 6,353,613 B1 | 3/2002 | Kubota et al. | |
| 6,360,055 B1 | 3/2002 | Kaneshige et al. | |
| 6,377,747 B1 | 4/2002 | Murase et al. | |
| 6,385,388 B1 | 5/2002 | Lewis et al. | |
| 6,385,389 B1 | 5/2002 | Maruyama et al. | |
| 6,385,394 B1 | 5/2002 | Okada et al. | |
| 6,385,398 B1 | 5/2002 | Matsumoto | |
| 6,393,574 B1 | 5/2002 | Kashiwagi et al. | |
| 6,415,101 B1 | 7/2002 | DeCarmo et al. | |
| 6,424,797 B1 | 7/2002 | Murase et al. | |
| 6,445,872 B1 | 9/2002 | Sano et al. | |
| 6,470,140 B1 | 10/2002 | Sugimoto et al. | |
| 6,470,460 B1 | 10/2002 | Kashiwagi et al. | |
| 6,504,996 B1 | 1/2003 | Na et al. | |
| 6,515,101 B1 | 2/2003 | Sheares | |
| 6,546,195 B2 | 4/2003 | Kashiwagi et al. | |
| 6,556,774 B2 | 4/2003 | Tsumagari et al. | |
| 6,564,006 B1* | 5/2003 | Mori et al. | 386/95 |
| 6,567,608 B2 | 5/2003 | Mori et al. | |
| 6,573,819 B1 | 6/2003 | Oshima et al. | |
| 6,584,277 B2 | 6/2003 | Tsumagari et al. | |
| 6,603,517 B1 | 8/2003 | Shen et al. | |
| 6,618,396 B1 | 9/2003 | Kondo et al. | |
| 6,654,543 B2 | 11/2003 | Ando et al. | |
| 6,788,883 B1 | 9/2004 | Park et al. | |
| 6,801,713 B1* | 10/2004 | Yagawa et al. | 386/69 |
| 6,901,078 B2 | 5/2005 | Morris | |
| 6,904,227 B1 | 6/2005 | Yamamoto et al. | |
| 7,024,102 B1 | 4/2006 | Inoshita et al. | |
| 7,072,573 B2 | 7/2006 | Okada et al. | |
| 7,106,946 B1 | 9/2006 | Kato | |
| 7,124,303 B2 | 10/2006 | Candelore et al. | |
| 7,236,687 B2 | 6/2007 | Kato et al. | |
| 7,245,825 B2* | 7/2007 | Kikuchi et al. | 386/95 |
| 2001/0033517 A1 | 10/2001 | Ando et al. | |
| 2001/0038745 A1 | 11/2001 | Sugimoto et al. | |
| 2001/0043790 A1* | 11/2001 | Saeki et al. | 386/65 |
| 2001/0053280 A1 | 12/2001 | Yamauchi et al. | |
| 2002/0015383 A1 | 2/2002 | Ueno | |
| 2002/0015581 A1* | 2/2002 | Ando et al. | 386/95 |
| 2002/0021761 A1 | 2/2002 | Zhang et al. | |
| 2002/0031336 A1 | 3/2002 | Okada et al. | |
| 2002/0046328 A1* | 4/2002 | Okada | 711/151 |
| 2002/0076201 A1* | 6/2002 | Tsumagari et al. | 386/70 |
| 2002/0097981 A1 | 7/2002 | Seo et al. | |
| 2002/0097984 A1 | 7/2002 | Abecassis | |
| 2002/0106196 A1 | 8/2002 | Yamauchi et al. | |
| 2002/0127002 A1 | 9/2002 | Mori et al. | |
| 2002/0145702 A1 | 10/2002 | Kato et al. | |
| 2002/0159368 A1 | 10/2002 | Noda et al. | |
| 2002/0180803 A1 | 12/2002 | Kaplan et al. | |
| 2002/0196365 A1* | 12/2002 | Cho et al. | 348/487 |
| 2002/0197059 A1* | 12/2002 | Cho et al. | 386/69 |
| 2003/0002194 A1 | 1/2003 | Andoh | |
| 2003/0026597 A1 | 2/2003 | Cho et al. | |
| 2003/0118327 A1 | 6/2003 | Um et al. | |
| 2003/0123849 A1 | 7/2003 | Nallur et al. | |
| 2003/0133509 A1 | 7/2003 | Yanagihara et al. | |
| 2003/0161615 A1 | 8/2003 | Tsumagari et al. | |
| 2003/0221055 A1 | 11/2003 | Okada | |
| 2003/0235403 A1 | 12/2003 | Seo et al. | |
| 2003/0235404 A1 | 12/2003 | Seo et al. | |
| 2004/0086261 A1 | 5/2004 | Hanes | |
| 2004/0156621 A1 | 8/2004 | Seo et al. | |
| 2004/0179819 A1 | 9/2004 | Cho et al. | |
| 2004/0179820 A1 | 9/2004 | Kashiwagi et al. | |
| 2004/0179827 A1 | 9/2004 | Cho et al. | |
| 2004/0247290 A1 | 12/2004 | Seo et al. | |
| 2004/0252975 A1 | 12/2004 | Cho et al. | |
| 2005/0025458 A1 | 2/2005 | Sasamoto et al. | |
| 2005/0025459 A1 | 2/2005 | Kato et al. | |
| 2005/0036763 A1 | 2/2005 | Kato et al. | |
| 2005/0180289 A1 | 8/2005 | Manabu et al. | |
| 2005/0232111 A1* | 10/2005 | Sawabe et al. | 369/59.25 |
| 2006/0062547 A1 | 3/2006 | Hamada | |
| 2006/0222340 A1* | 10/2006 | Yamauchi et al. | 386/95 |
| 2007/0031122 A1* | 2/2007 | Yamagata et al. | 386/95 |

FOREIGN PATENT DOCUMENTS

| | | |
|---|---|---|
| CN | 1150293 | 5/1997 |
| CN | 1197573 | 10/1998 |
| CN | 1220458 | 6/1999 |
| CN | 1237852 | 12/1999 |
| CN | 1251461 | 4/2000 |
| EP | 0723216 | 7/1996 |
| EP | 0737980 | 10/1996 |
| EP | 0836183 | 4/1998 |
| EP | 0873022 | 10/1998 |
| EP | 0 896 337 | 2/1999 |
| EP | 0847198 | 4/1999 |
| EP | 0917355 | 5/1999 |
| EP | 0918438 | 5/1999 |
| EP | 0920203 | 6/1999 |
| EP | 0940983 | 9/1999 |
| EP | 1 003 338 | 5/2000 |
| EP | 1 043 724 | 10/2000 |
| EP | 1081885 | 3/2001 |
| EP | 1126454 | 8/2001 |
| EP | 1198132 | 4/2002 |
| EP | 1198133 | 4/2002 |
| EP | 1202568 | 5/2002 |
| JP | 64-003781 | 1/1989 |
| JP | 01-116819 | 5/1989 |
| JP | 08-088832 | 4/1996 |
| JP | 08-235833 | 9/1996 |
| JP | 09-023403 | 1/1997 |

| | | |
|---|---|---|
| JP | 09-251759 | 9/1997 |
| JP | 10-032780 | 2/1998 |
| JP | 10-040667 | 2/1998 |
| JP | 10-51737 | 2/1998 |
| JP | 10-269698 | 10/1998 |
| JP | 10-271449 | 10/1998 |
| JP | 10-299698 | 11/1998 |
| JP | 11-041563 | 2/1999 |
| JP | 11-066813 | 3/1999 |
| JP | 11-103444 | 4/1999 |
| JP | 11-134812 | 5/1999 |
| JP | 11-185463 | 7/1999 |
| JP | 11-259976 | 9/1999 |
| JP | 11-346341 | 12/1999 |
| JP | 2000-030414 | 1/2000 |
| JP | 2000-041066 | 2/2000 |
| JP | 2000-069437 | 3/2000 |
| JP | 2000-113602 | 4/2000 |
| JP | 2000-149514 | 5/2000 |
| JP | 2000-235779 | 8/2000 |
| JP | 2000-293938 | 10/2000 |
| JP | 2000-299836 | 10/2000 |
| JP | 2000-348442 | 12/2000 |
| JP | 2001-024973 | 1/2001 |
| JP | 2001-024985 | 1/2001 |
| JP | 2001-111944 | 1/2001 |
| JP | 2001-67802 | 3/2001 |
| JP | 2001-111929 | 4/2001 |
| JP | 2001-111960 | 4/2001 |
| JP | 2001-169246 | 6/2001 |
| JP | 2001-297535 | 10/2001 |
| JP | 2002-083486 | 3/2002 |
| JP | 2002-112179 | 4/2002 |
| JP | 2002-150685 | 5/2002 |
| JP | 2002-158972 | 5/2002 |
| JP | 2002-158974 | 5/2002 |
| JP | 2002-176623 | 6/2002 |
| JP | 2002-216460 | 8/2002 |
| JP | 2002-222581 | 8/2002 |
| JP | 2003-087744 | 3/2003 |
| JP | 2003-116100 | 4/2003 |
| JP | 2006-503400 | 1/2006 |
| KR | 10-1999-0022858 | 10/1997 |
| KR | 10-2000-0031861 | 6/2000 |
| KR | 10-2000-0055028 | 9/2000 |
| KR | 10-2000-0056179 | 9/2000 |
| KR | 10-2000-0065876 | 11/2000 |
| KR | 10-2001-0022702 | 3/2001 |
| KR | 10-0294884 | 4/2001 |
| KR | 10-2001-0098007 | 11/2001 |
| KR | 10-2001-0098101 | 11/2001 |
| KR | 10-2001-0107578 | 12/2001 |
| KR | 10-2002-0006674 | 1/2002 |
| KR | 10-2002-0020919 | 3/2002 |
| KR | 10-2002-0097454 | 12/2002 |
| KR | 10-2002-0097455 | 12/2002 |
| KR | 10-2004-0000290 | 1/2004 |
| KR | 10-2004-0030992 | 4/2004 |
| KR | 10-2004-0030994 | 4/2004 |
| KR | 10-2004-0030995 | 4/2004 |
| KR | 10-2004-0041581 | 5/2004 |
| TW | 391548 | 5/2000 |
| WO | WO 97/06531 | 2/1997 |
| WO | WO 97/13364 | 4/1997 |
| WO | WO 97/13365 | 4/1997 |
| WO | WO 97/13366 | 4/1997 |
| WO | WO 98/00952 | 1/1998 |
| WO | WO 99/08281 | 2/1999 |
| WO | WO 99/34601 | 7/1999 |
| WO | WO 00/02195 | 1/2000 |
| WO | WO 00/05883 | 2/2000 |
| WO | WO 00/42515 | 7/2000 |
| WO | WO 00/62295 | 10/2000 |
| WO | WO 01/80239 | 10/2001 |
| WO | WO 01/82604 | 11/2001 |
| WO | WO 01/82606 | 11/2001 |
| WO | WO 01/82609 | 11/2001 |
| WO | WO 01/82610 | 11/2001 |
| WO | WO 04/01748 | 12/2003 |
| WO | WO 04/01750 | 12/2003 |
| WO | WO 2004/001753 | 12/2003 |
| WO | WO 2004/045206 | 5/2004 |
| WO | WO2004/0075181 | 9/2004 |
| WO | WO 2004-075183 | 9/2004 |
| WO | WO 2004/077417 | 9/2004 |
| WO | WO 2004/079736 | 9/2004 |
| WO | WO 2004/081939 | 9/2004 |
| WO | WO 2004/086371 | 10/2004 |

OTHER PUBLICATIONS

European Search Report dated Aug. 13, 2008.
Japanese Office Action for corresponding Japanese Application No. 2004-551246 dated May 20, 2008.
Chinese Office Action dated Dec. 14, 2007.
Japanese Office Action dated Jan. 22, 2008.
European Search Report dated Dec. 28, 2007.
European Search Report dated Jan. 2, 2008.
United States Office Action dated Jan. 2, 2008.
Search Report for corresponding European Application No. 03761863.4 dated Mar. 25, 2008.
Office Action for corresponding Japanese Application No. 2004-517368 dated May 7, 2008.
Office Action for corresponding Japanese Application No. 2004-517390 dated May 7, 2008.
Office Action for corresponding Japanese Application No. 2006-196199 dated Apr. 22, 2008.
United States Office Action dated Jul. 9, 2008.

* cited by examiner

FIG. 4

*PGC Information # i ( PGCI # i)*

| PGC General Information (PGC_GI) |
|---|
| Program Information # 1 (PGI #1) |
| ⋮ |
| Program Information # k (PGI #k) |
| ⋮ |
| Program Information # n (PGI #n) |
| Cell Information Search Pointer #1 (CI_SRP #1) |
| ⋮ |
| Cell Information Search Pointer #n (CI_SRP #m) |
| Cell Information #1 (CI #1) |
| ⋮ |
| Cell Information #k (CI #k) |
| ⋮ |
| Cell Information #m (CI #m) |

| Reserved |
|---|
| PG_TY ( Program Type ) |
| C_Ns ( Number of Cells in this PG ) |
| PRM_TXTI ( Primary Text Information ) |
| REP_PI ( Representative Picture Information ) |
| THM_SRPN ( Thumbnail Search Pointer Number ) |
| IT_TXT_SRPN ( IT_TXT Search Pointer Number for this Play List ) |

| C_TY ( Cell Type ) |
|---|
| HOBI_SRPN ( HOBI Search Pointer Number ) |
| CHI (Channel Information) |

| PTMAPN ( PTMAP Number ) |
|---|
| C_V_S_PTM ( start PTM of this Cell ) |
| C_V_E_PTM ( End PTM of this Cell ) |

FIG. 6

METHOD AND APPARATUS OF RECORDING A MULTI-CHANNEL STREAM, AND A RECORDING MEDIUM CONTAINING A MULTI-CHANNEL STREAM RECORDED BY SAID METHOD

BACKGROUND OF THE INVENTION

1. Field of the Invention

The present invention relates to method and apparatus of recording a multi-channel data stream on a recording medium, e.g., a writable high-density digital versatile disk (abbreviated to 'HD-DVD' hereinafter) in such a manner that substreams of digital channels constituting the multi-channel data stream can be distinguished each other in reproduction.

The present invention further relates to a recording medium on which a multi-channel data stream is recorded in such a manner that substreams of digital channels constituting the multi-channel data stream can be distinguished each other in reproduction.

2. Description of the Related Art

Owing to technical improvement in the fields of video/audio data compression, digital modulation/demodulation, and so on, a digital television broadcast system broadcasting TV signals in the form of digital data stream is being standardized rapidly.

In the digital television broadcast system, audio/video (A/V) signals to be broadcasted are compressed according to the data compressing rule specified by MPEG 2 (Moving Picture Experts Group) and the compressed A/V data are broadcasted in the form of transport stream (TS), which is also defined in MPEG 2 standard, composed of successive 188-byte-long transport packets (TPs).

The digital TV broadcast system, which will be commercialized soon owing to technical improvement of A/V data compression and transmission, is able to support much higher-quality of video and audio than an analog TV system. Furthermore, it ensures data compatibility with a digital communication device, a digital storage device, etc.

In the meantime, a new device is being developed to prepare for commercialization of digital TV broadcast system. That is a digital recorder being able to receive TS of digital broadcast programs and to record it on a writable HD-DVD. Such a digital recorder will be widely used as the digital TV broadcast system is commercialized in earnest.

A single physical broadcast channel (called 'RF channel' in general) has about 6 MHz bandwidth which ensures 19.4 Mbps data rate. This data rate can carry a single HD-TV broadcast signal or about four SD-TV signals. Such a logical or virtual channel carrying one SD-TV signal in an RF channel is called 'digital channel'.

In other words, a single RF channel sometimes includes several digital channels, namely, sub-channels which carry mutually-different broadcast programs.

Therefore, a DVD recorder being developed may have to record two or more digital channels simultaneously at a user's request. However, if a DVD recorder records a plurality of digital channels and creates management information through the same manner as it does for a single digital channel, a DVD could not tell digital channels apart among a recorded stream of digital channels. Namely, a user could not select only one program, i.e., one digital channel to be reproduced among the recorded plurality of digital channels.

SUMMARY OF THE INVENTION

It is an object of the present invention to provide method and apparatus of recording a multi-channel stream on a recording medium in a manner that substreams in the multi-channel stream can be distinguished each other in reproduction mode by management information and/or by totally or partially area-separate recording.

It is another object of the present invention to provide a method of enabling all digital channels of a multi-channel stream to be indexed individually by a file system through creating a file for each digital channel stream.

A method of recording a multi-channel on a recording medium in accordance with the present invention is characterized in that it comprises the steps of: recording a multi-channel stream composed of substreams belonging to a plurality of channels on a recording medium; and creating as many files as the number of the plural channels, each file being associated with each substream.

An apparatus of recording a multi-channel on a recording medium in accordance with the present invention is characterized in that it comprises: a data receiver receiving at least one RF channel of a digital broadcast signal to output a multi-channel stream composed of substreams belonging to selected plural sub-channels; and a recording means recording the multi-channel stream in at least one stream object allocated in a recording medium, and creating as many files as the number of substreams to associate each substream with each file.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIGS. 4 and 5 are illustrative structures of navigation data created when a multi-channel stream is recorded as shown in FIG. 3;

FIG. 6 illustrates the second embodiment of creating navigation data for substreams of a plurality of digital channels recorded in plural high-density stream objects in accordance with the present invention;

DETAILED DESCRIPTION OF THE PREFERRED EMBODIMENT

In order that the invention may be fully understood, a preferred embodiment thereof will now be described with reference to the accompanying drawings.

Figure 1:
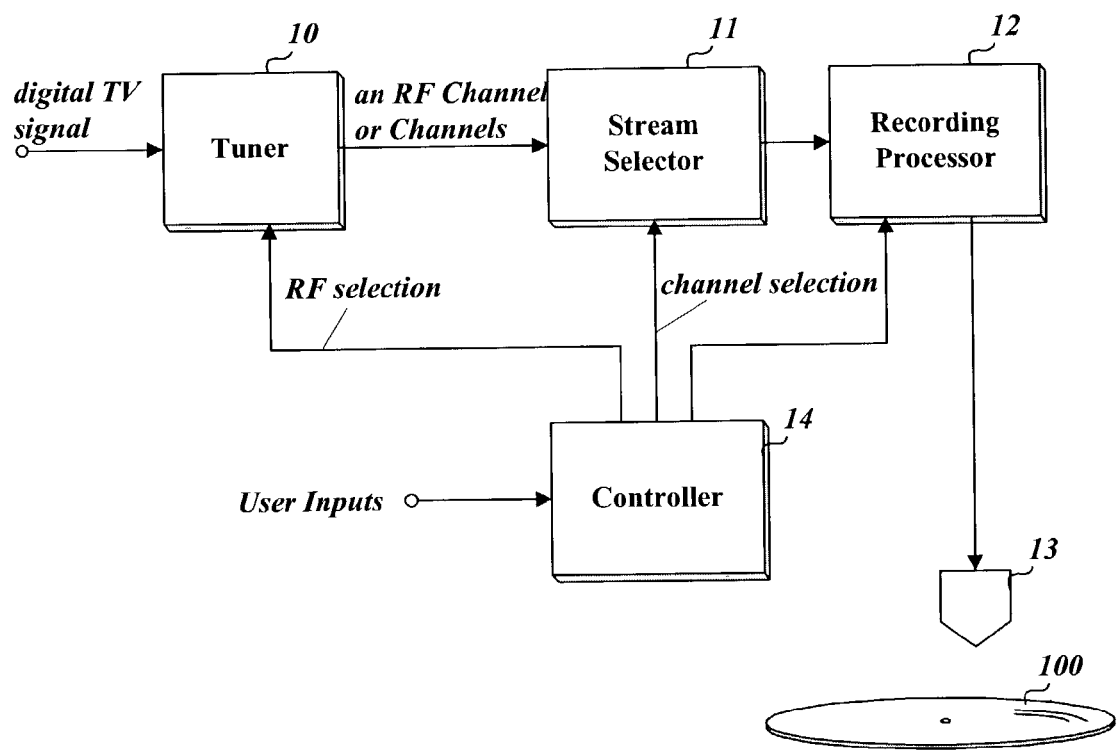
FIG. 1 is a block diagram of an apparatus recording a multi-channel stream in accordance with the present invention.

FIG. 1 is a block diagram of an apparatus recording a multi-channel stream in accordance with the present invention.

The apparatus of FIG. 1 may be a digital video recorder (DVR) being able to record a digital broadcast signal on a recording medium, e.g., a writable HD-DVD. The apparatus comprises a tuner 10 tuning its passband to at least one RF band of digital broadcast TV signal; a stream selector 11 selecting a plurality of substreams belonging to chosen digital channels (or sub-channels) from a data stream of an RF channel or channels passed by the tuner 10; a recording processor 12 recording the selected substreams in a single HOB (High-Density Stream Object) or HOBs according to a preset recording mode, creating and writing navigation data every a recorded substream; an optical pickup 13 forming mark/space patterns on a HD-DVD 100 in accordance with bit patterns of stream and navigation data outputted from the recording processor 12; and a controller 14 conducting overall control operations of all elements for multi-stream record.

Figure 2:
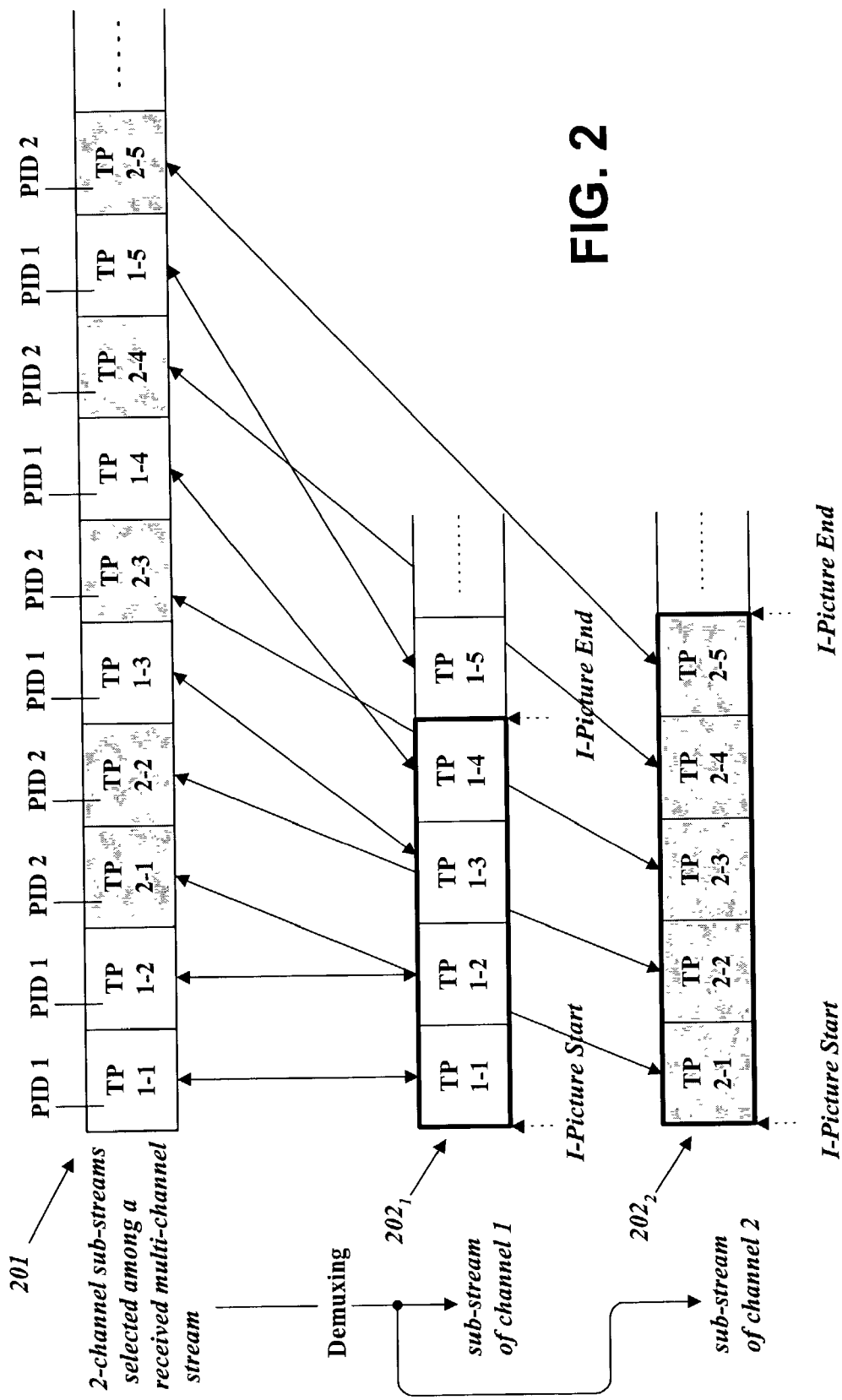
FIG. 2 illustrates a series of transport packets belonging to two sub-channels outputted in the form of single stream or mutually-separated streams.

The tuner 10 passes one digital broadcast TV channel, namely, an RF channel selected by the controller 14. The stream selector 11 extracts transport packets (TPs) belonging to several, e.g., 2 digital channels selected through the controller 14 from a multi-channel stream of the RF channel passed by the tuner 10. The extracted series of TPs by the stream selector 11 is outputted in the form of single stream 201 or mutually-separated streams $202_1$ and $202_2$, as illustrated in FIG. 2.

The tuner 10 can also pass multiple RF channels. In multiple passing mode, the stream selector 11 is also able to extract more than one substream from each RF channel to output a series of TPs belonging to digital channels chosen from available channels offered by respective RF channels.

For the convenience of explanation, it is supposed in all embodiments described in below that the stream selector 11 selects two substreams, namely, two digital channels from a received multi-channel stream.

The recording processor 12 can distinguish two digital-channel substreams, namely, the first and the second substream each other based on packet ID (PID) written in every TP outputted from the stream selector 11.

The first and the second digital-channel substream are recorded according to a preset recording mode. If the preset recording mode is 'separate', the recording processor 12 records two multiplexed substreams separately in two allocated HOBs 301 and 302 in the order as they are received for each digital channel from the stream selector 12 as shown in FIG. 3.

To separately record a plurality of substreams in plural HOBs, the recording processor 12 has enough buffering capacity. And, the optical pickup 13 moves between allocated plural HOBs during data buffering of the recording processor 12 and it records the buffered data in a target HOB all at once.

Furthermore, the recording processor 12 creates navigation data for each digital-channel substream, namely, for each HOB based on the distinguished digital-channel information and each substream recording information. The way how navigation data is created is described below in detail.

Figure 3:
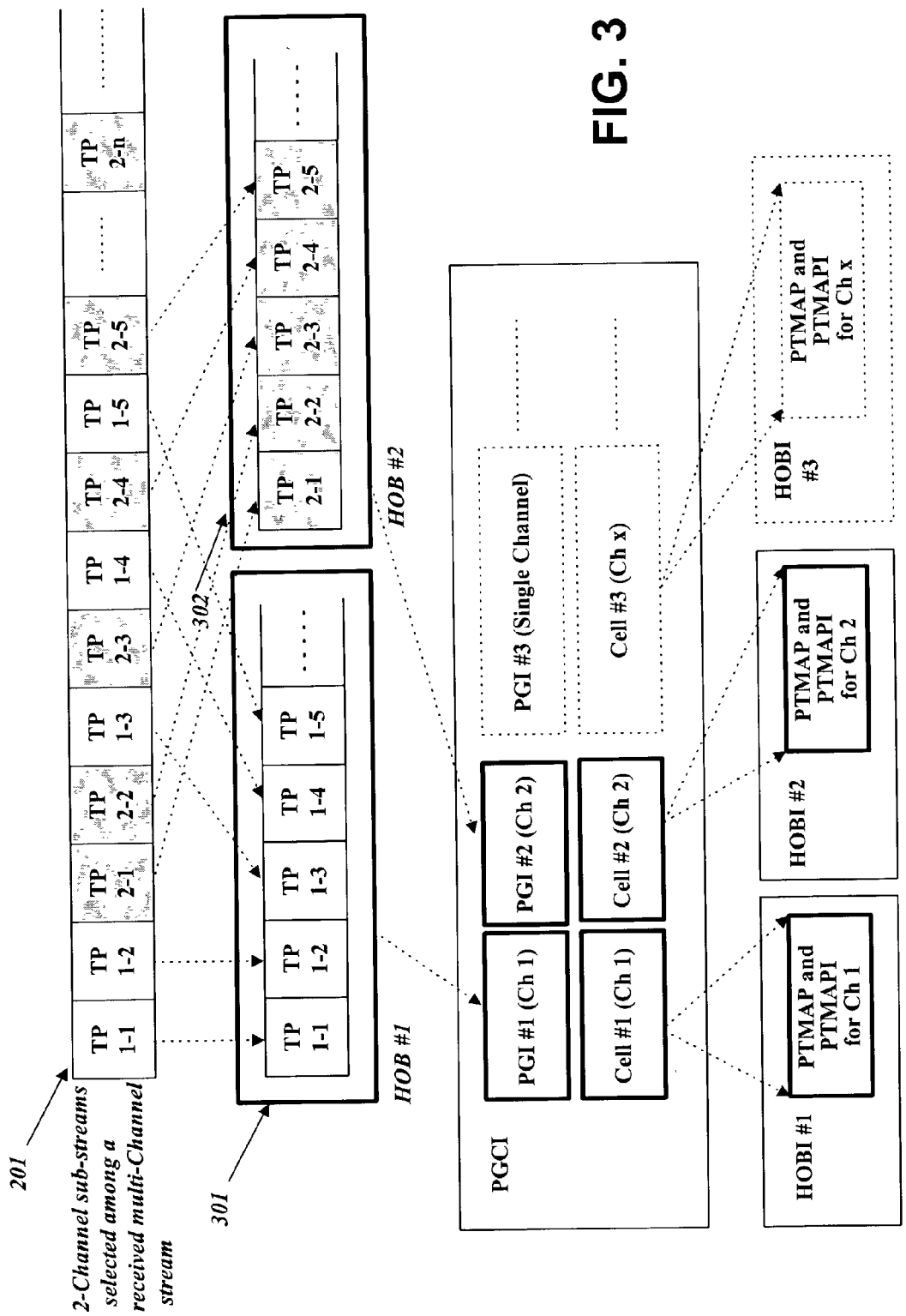
FIG. 3 illustrates the first embodiment of creating navigation data for substreams of a plurality of digital channels recorded in plural high-density stream objects in accordance with the present invention.

FIG. 3 illustrates the first embodiment of creating navigation data for substreams of a plurality of digital channels recorded in plural HOBs in accordance with the present invention.

A recording medium for recording a digital broadcast signal has a provisional recording standard. According to the provisional recording standard, a recording medium shall have Program Chain Information (PGCI) prepared for index of every recorded program and for reproduction order among them. The PGCI includes Program Information (PGI) and Cell Information (CI) which are respectively created every a data stream continuously recorded from recording start to stop. Furthermore, a single Presentation Time Map (PTMAP) shall be also created every a recorded data stream according to the provisional recording standard. The PTMAP, used for stream search, has collection of position data or position-related time length data for every data unit constituting a recorded data stream. Search pointer and information of each PTMAP are included in HOB information (HOBI).

However, in the present recording method, not a single but plural HOBs are formed through one-time recording of a multi-channel stream. Therefore, for two substreams separated in two HOBs, two pieces of PGI 'PGI #1 and PGI #2' and two pieces of CI 'Cell #1 and Cell #2' are created and two pieces of PTMAPI for two PTMAPs are created too, as shown in FIG. 3.

The PGI and the CI are written in the PGCI while the two pieces of PTMAPI and the two PTMAPs are stored separately in the two pieces of HOBI.

In general, navigation data such as PGCI and HOBI is loaded into a memory (not figured) from the HD-DVD 100 during recording mode, and the pieces of PGI, CI and HOBI created as above are inserted in the navigation data which will be stored in a navigation data area of the HD-DVD 100 after the substreams of plural digital channels are completely recorded.

Figure 5:
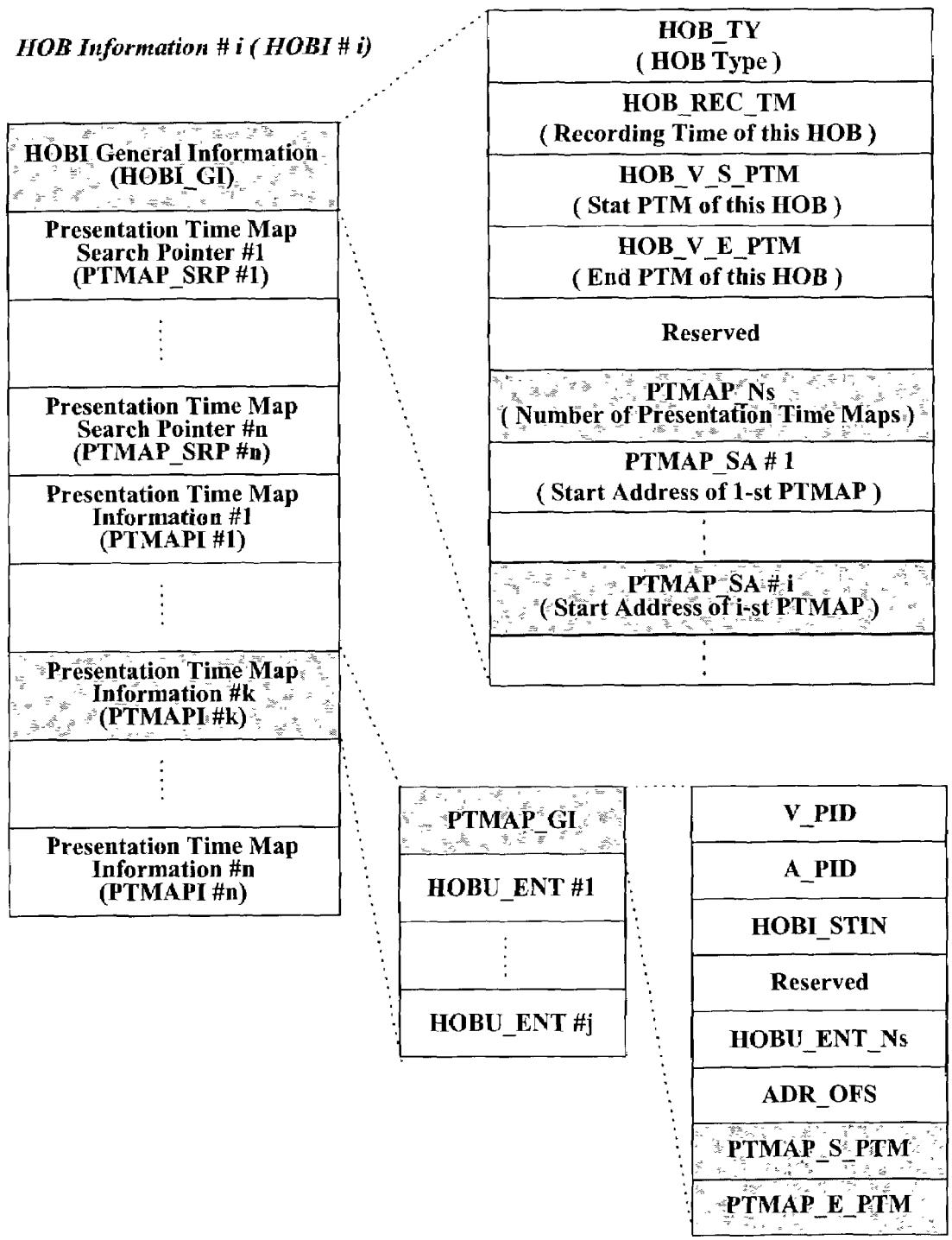

FIGS. 4 and 5 are illustrative structures of navigation data created when a multi-channel stream is recorded as shown in FIG. 3.

The PGCI of FIG. 4 includes program chain general information 'PGC_GI', plural pieces of PGI 'PGI #1 to #n', a plurality of CI search pointers 'CI_SRP #1 to #m', and plural pieces of CI 'CI #1 to #m'. Each piece of PGI includes fields of program type 'PG_TY' and the number of CI 'C_Ns'. However, the number of CI 'C_Ns' may not be allocated since a single piece of PGI is associated with a single piece of CI. If allocated, '1' is always written in that field 'C_Ns'.

The program type 'PG_TY', 8-bit long, includes 'Protect' flag to indicate whether an associated program (PG), equivalent to a conceptually-unitized stream, is erasable or not.

Each piece of CI is composed of cell type 'C_TY', HOBI search pointer number 'HOBI_SRPN', and channel information 'CHI' consisting of PTMAP number 'PTMAPN', start PTM of a cell 'C_V_S_PTM', and end PTM of a cell 'C_V_E_PTM'.

The field 'C_TY', 8-bit long, is composed of sub-fields of 2-bit cell type 'C_TY1', 3-bit channel number of a cell 'C_CH_N', and reserved. The sub-field 'C_TY1' indicates whether a cell is related with multi-channel or single-channel stream. The sub-field 'C_CH_N' describes digital channel number of a recorded substream in a HOB referred by a cell.

For example, digital channel numbers of the first and the second substream are respectively written in those sub-fields 'C_CH_N' of the two pieces of CI 'CIs #1 and #2' respectively referring to the HOBs 301 and 302 of FIG. 3 in which two substreams of two digital channels are separately included.

The HOBI, linked with the CI through the field 'HOBI_S-RPN' included in each piece of CI, comprises HOBI general information 'HOBI_GI', a plurality of PTMAP search pointers 'PTMAP_SRP #1 to #n', and plural pieces of PTMAP information 'PTMAPI #1 to #n', as shown in FIG. 5.

The HOBI general information 'HOBI_GI' consists of many fields of HOB type 'HOB_TY', HOB recording time 'HOB_REC_TM', start PTM of a HOB, end PTM of a HOB, the number of PTMAPs 'PTMAP_Ns', and start addresses of all PTMAPs 'PTMAP_SA #i'.

The PTMAPI includes PTMAP general information 'PTMAP_GI' and entries of random accessible HOB units (HOBUs) 'HOBU_ENT #1 to #j'. The PTMAP general information 'PTMAP_GI' is composed of fields of video 'V_PID' and audio packet ID 'A_PID', indicative of respective PIDs of audio and video TPs constituting a recorded stream associated with a PTMAP, HOBI index number 'HOBI_STIN', the number of random accessible HOBUs 'HOBU_ENT_Ns', start PTM of a PTMAP 'PTMAP_S_PTM', and end PTM of a PTMAP 'PTMAP_E_PTM'.

Since all substreams constituting a multi-channel stream are separately recorded in plural HOBs and the navigation data structured as shown in FIGS. 4 and 5 is created and recorded for a recorded multi-channel stream, a HOB containing a single substream of a digital channel to be reproduced can be determined based on information written in each piece of PGI and CI included in the PGCI, especially the channel number sub-field 'C_CH_N' allocated in the cell type 'C_TY'.

When searching a substream of a chosen digital channel unitized to a single HOB, a PTMAP associated with a substream of the chosen digital channel is determined first based on the information written in the number of PTMAPs 'PTMAP_Ns', each PTMAP start address 'PTMAP_SA #i', and start and end PTM of a PTMAP 'PTMAP_S_PTM' and 'PTMAP_E_PTM' of the PTMAP general information 'PTMAP_GI' of each piece of PTMAP information 'PTMAPI #i'. Next, a substream in the determined HOB is searched and then reproduced using PTM incremental time and size of each data unit written in the determined PTMAP.

Figure 6:
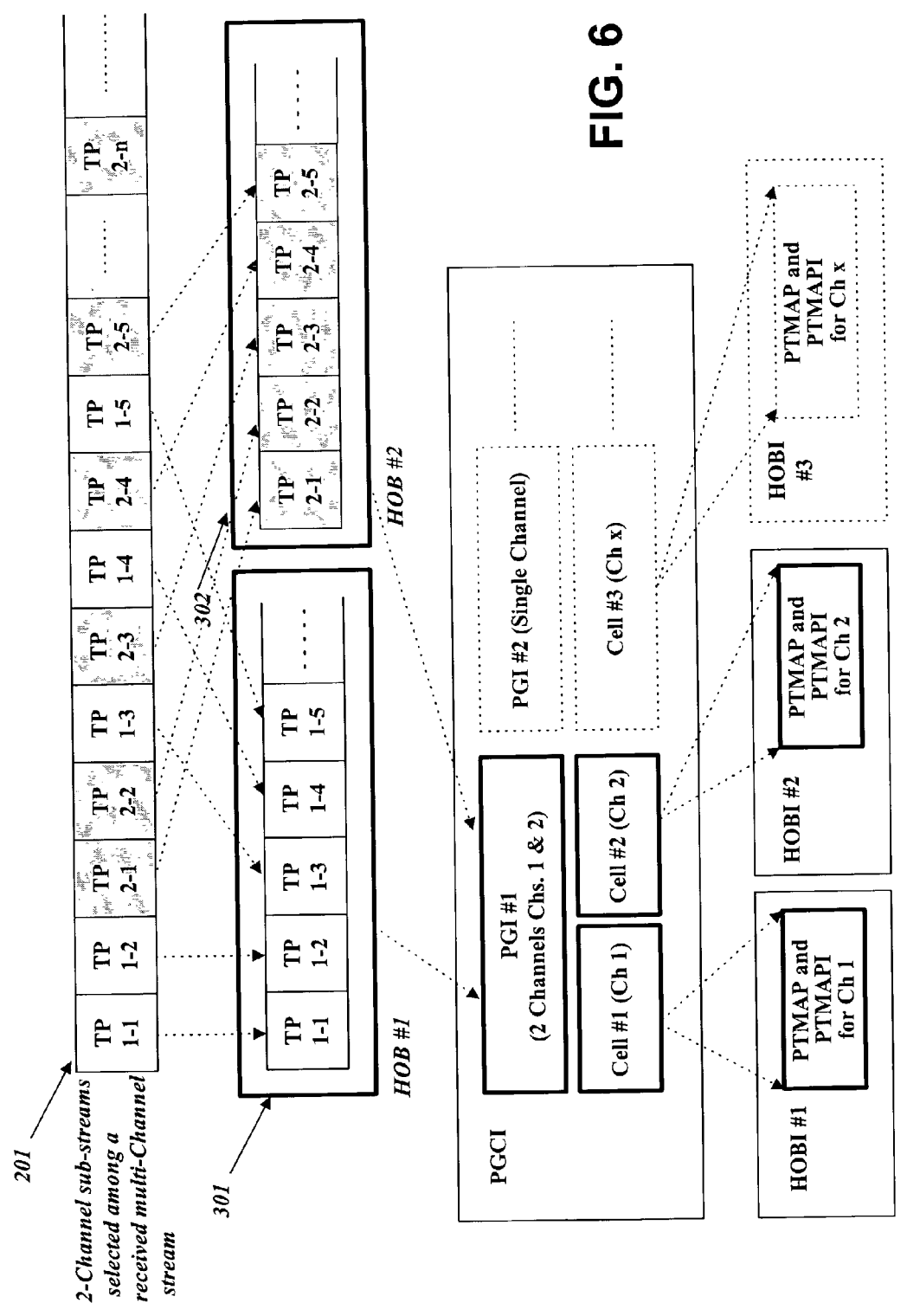

FIG. 6 illustrates the second embodiment of creating navigation data for substreams of a plurality of digital channels recorded in plural HOBs in accordance with the present invention.

This second embodiment of FIG. 6 is different from the first of FIG. 3 in that a single piece of PGI is created for plural HOBs. However, a couple of PTMAP and PTMAPI used for searching substream is created every a HOB the same as the first embodiment, namely, as many pieces of PTMAP and PTMAPI as the number of digital channels are created.

Since this second embodiment is different from the first in the number of pieces of PGI created after recording substreams of a plurality of digital channels, the structure of the PGI is changed from FIG. 4.

In this second embodiment, a piece of PGI covers a plurality of substreams, which means that it is associated with plural pieces of CI each of which covers a single substream. Therefore, the PGI shall accompany the field 'C_Ns' to describe the number of pieces of CI associated with it.

The program type 'PG_TY', besides 'Protect' flag, includes 'S/M' flag and 3-bit number of channels 'Channel_Ns' where the 'S/M' indicates whether an associated PG includes a single-channel or a multi-channel stream, and the number of channels 'Channel_Ns' describes the number of digital channels included in an associated PG.

Even in this second embodiment, all information on every recorded substream of every digital channel is included in navigation data the same as in the first embodiment. Therefore, a substream of a selected digital channel only, which is unitized to a single HOB, can be searched and reproduced among multiple substreams recorded simultaneously.

Figure 7:
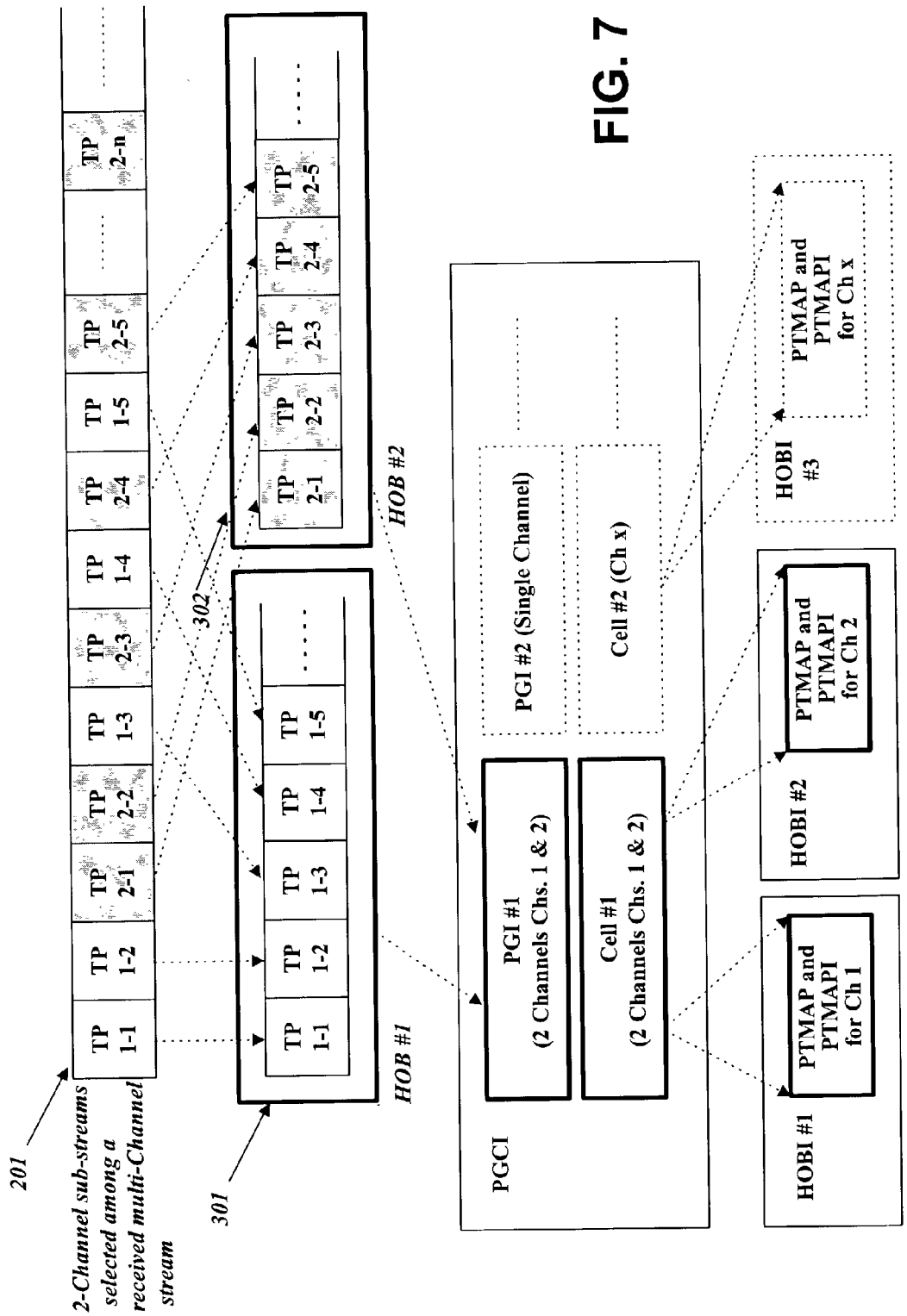
FIG. 7 illustrates the third embodiment of creating navigation data for substreams of a plurality of digital channels recorded in plural high-density stream objects in accordance with the present invention.

FIG. 7 illustrates the third embodiment of creating navigation data for substreams of a plurality of digital channels recorded in plural HOBs in accordance with the present invention.

This third embodiment of FIG. 7 is different from the first of FIG. 3 in that a single piece of PGI and CI is created respectively. However, the PTMAPI used for searching substream is created the same as the first embodiment, namely, as many pieces of PTMAPI as the number of digital channels, equivalent to the number of created HOBs, contained in a multi-channel stream are created.

Since this third embodiment is different from the first in the number of pieces of PGI and CI created after recording substreams of a plurality of digital channels, minor modification is required in the structure of navigation data of FIG. 4.

In this third embodiment, a piece of PGI covers a plurality of substreams, therefore, the program type 'PG_TY', besides 'Protect' flag, includes the 'S/M' flag and the 3-bit number of channels 'Channel_Ns'. Both sub-fields have been described in the second embodiment.

In this third embodiment, a piece of CI also covers a plurality of substreams, therefore a piece of CI includes a 'field of the number of channels' besides the fields of FIG. 4, and the channel information 'CHI' composed of the PTMAP number 'PTMAPN', start PTM of a cell 'C_V_S_PTM', and end PTM of a cell 'C_V_PTM' is created as many as the number of digital channels of a recorded multi-channel stream distributed separately by channel in plural HOBs referred by the single piece of CI. In addition, an additional field for writing digital channel numbers is reserved in the CI since a single piece of CI covers all of digital channels contained in a recorded multi-channel stream.

Since the CI also has information on the number of channels of a recorded stream, the sub-field 'Channel_Ns' for the number of channels need not be allocated in the PGI. In addition, because a single piece of CI is created even though a stream of a plurality of digital channels is recorded, the field 'C_Ns' indicative of the number of pieces of CI can be removed from the PGI of FIG. 4.

Even in this third embodiment, all information on every substream of every digital channel is stored in navigation data the same as in the first embodiment. Therefore, a substream of a selected digital channel only, which is unitized to a single HOB, can be searched and reproduced among multiple substreams recorded simultaneously.

In the meantime, a file is created for each digital channel stream. Namely, for the two substreams 301 and 302 unitized to the first #1 and the second HOB #2, respectively, two files, e.g., 'H0001.mts' and 'H0002.mts' are created. Each file has start address of data allocation unit (AU) among AU addresses, which are chained each other in FAT (File Allocation Table), at which corresponding substream has been recorded.

Figure 8:
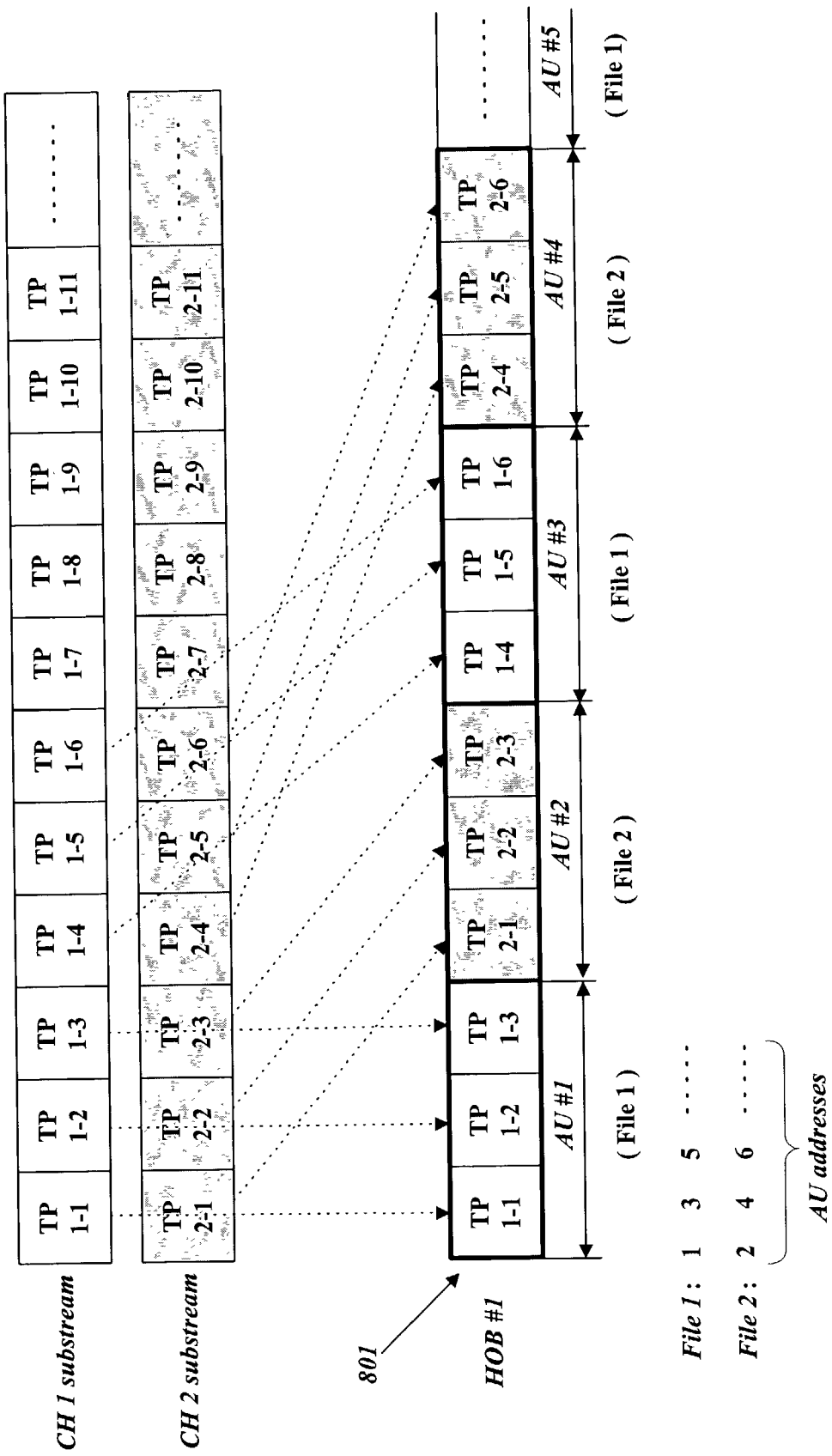
FIG. 8 illustrates plural files created for substreams of a plurality of digital channels recorded in a single high-density stream object in accordance with the present invention.

Unlike the above-explained embodiments, entire multi-channel stream can be unitized to a single HOB. As shown in FIG. 8, the recording processor 12 records two multiplexed substreams from the stream selector 11 in a single HOB 801 while grouping every some TPs for each substream and interleaving grouped units of different channels sequentially. TPs are grouped until their size can fill at least one AU. Preferably, the TP-grouped unit interleaved one after another channel is equivalent to a random accessible GOP (Group of Pictures) unit defined in MPEG standard. Since a GOP consists of full pictures only, pictures are not broken even if data is reproduced from its start point, therefore, every GOP ensures random accessibility.

For the case that entire multi-channel stream is written in a single HOB, a file is created for each substream. In other words, as many files as the number of substreams are created. In this embodiment, AUs 1, 2, 3, 4, 5, . . . used for the single HOB alternately belong to one of two files, as shown in FIG. 8.

In the meantime, the size of the TP-grouped unit interleaved one after another channel may be written in a file descriptor of each of the created plural files.

The above-explained multi-channel stream recording method and apparatus make it possible to selectively search and reproduce each substream among a multi-channel stream recorded on a recording medium through selection of files distinguishing substreams individually, thereby improving use convenience of a recording machine such as a digital video recorder.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for recording data for managing reproduction of video data representing reproduction paths, the method comprising:
   (a) receiving video data from an external source;
   (b) recording the received video data as a transport stream in a plurality of stream files on a recording medium, at least two of the stream files associated with multiple reproduction paths and the stream files interleaved with one another, and one or more stream files associated with a single reproduction path and the one or more stream files not interleaved with the stream files associated with multiple reproduction paths; and
   (c) recording at least one navigation list file, a plurality of navigation data items and a plurality of map files including maps, the at least one navigation list file including first and second navigation data items, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information data for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path, and wherein the navigation list file is separate from the map file and the stream files.

2. The method according to claim 1, wherein the external source comprises a broadcast signal.

3. The method according to claim 1, wherein the recording of the received video data comprises:
separating the transport stream into substreams; and recording each of the substreams in a separate stream file of the stream files.

4. The method according to claim 1, wherein the first navigation data item includes a multiple reproduction path indicator for indicating that the first navigation data item provides navigation information for multiple reproduction paths.

5. A recording apparatus for recording data for managing reproduction of video data representing reproduction paths, the method comprising:
   a data receiver configured to receive video data from an external source; and
   a recording device in communication with the data receiver, wherein the recording device configured to:
      record the received video data as a transport stream in a plurality of stream files on a recording medium, at least two of the stream files associated with the multiple reproduction paths and the stream files interleaved with one another, and one or more stream files associated with a single reproduction path and the one or more stream files not interleaved with the stream files associated with multiple reproduction paths; and
      record at least one navigation list file, a plurality of navigation data items and a plurality of map files including maps the at least one navigation list file including a first and a second navigation data item, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path, and wherein the navigation list file is separate from the map file and the stream files.

6. The recording apparatus according to claim 5, wherein the data receiver is configured to receive a broadcast signal from the external source.

7. The apparatus according to claim 5, wherein the recording device is configured to record the first navigation data item including a multiple reproduction path indicator for indicating that the first navigation data item provides navigation information for multiple reproduction paths.

8. A method of reproducing data recorded on a recording medium, the method comprising:
   (a) reading at least one navigation list file, a plurality of navigation data items and a plurality of map files including maps from a navigation area of the recording medium, the at least one navigation list file including a first and a second navigation data item, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path; and (b) reproducing data from a plurality of stream files including video data recorded on the recording medium, wherein at least two of the stream files are associated with multiple reproduction paths and interleaved with each other, each of the stream files corresponding to the multiple reproduction paths being reproduced based on the first navigation data item, and wherein at least one of the stream files is associated with a single reproduction path and not interleaved with the two stream files associated with the multiple reproduction paths, the at least one stream file corresponding to the single reproduction path being reproduced based on the second navigation data item, wherein the navigation list file is separate from the map files and the stream files.

9. An apparatus for reproducing data recorded on a recording medium, the apparatus comprising:

a pickup configured to reproduce data from the recording medium; and a controller, operably coupled to the pickup, configured to control;

reading at least one navigation list file, a plurality of navigation data items and a plurality of map files including maps from a navigation area of the recording medium, the at least one navigation list file including a first and a second navigation data item, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path; and reproducing data from a plurality of stream files including video data recorded on the recording medium, wherein at least two of the stream files are associated with multiple reproduction paths and interleaved with each other, each of the stream files corresponding to the multiple reproduction paths being reproduced based on the first navigation data item, and wherein at least one of the stream files is associated with a single reproduction oath and not interleaved with the two stream files associated with the multiple reproduction paths, the at least one stream file corresponding to the single reproduction path being reproduced based on the second navigation data item, wherein the navigation list file is separate from the map files and the stream files.

10. A recording medium, comprising:

a data area storing at least video data as a plurality of stream files on the recording medium, at least two of the stream files associated with multiple reproduction paths and the stream files interleaved with one another, and one or more stream files associated with a single reproduction path and the one or more stream files not interleaved with the stream files associated with multiple reproduction paths; and a navigation area storing at least one navigation list file, a plurality of navigation data items and a plurality of map files including maps, the at least one navigation list file including a first and a second navigation data item, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path, and wherein the navigation list file is separate from the map files and the stream files.

11. A method for recording data for managing reproduction of video data representing reproduction paths, the method comprising:

(a) recording video data as a transport stream in a plurality of stream files on a recording medium, at least two of the stream files associated with multiple reproduction paths and the stream files interleaved with one another, and one or more stream files associated with a single reproduction path and the one or more stream files not interleaved with the stream files associated with multiple reproduction paths; and (b) recording at least one navigation list file, a plurality of navigation data items and a plurality of map files including maps, the at least one navigation list including first and second navigation data items, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path, and wherein the navigation list file is separate from the map files and the stream files.

12. A recording apparatus for recording data for managing reproduction of video data representing reproduction paths, the method comprising:

a pickup configured to record video data on a recording medium; and a controller, operably coupled to the pickup, configured to control recording the video data as a transport stream in a plurality of stream files on a recording medium, at least two of the stream files associated with the multiple reproduction paths and the stream files interleaved with one another, and one or more stream files associated with a single reproduction path and the one or more stream files not interleaved with the stream files associated with multiple reproduction paths, and the controller further configured to control recording at least one navigation list file, a plurality of navigation data items and a plurality of map files including maps, the at least one navigation list including a first and a second navigation data item, the first navigation data item referencing more than one map for managing the multiple reproduction paths and the second navigation data item referencing a single map for managing the single reproduction path, and each navigation data item including an identifier identifying the map file associated with the navigation data item, the map file including at least one map providing position information for the video data, wherein a flag is stored in the first navigation data item, the value of the flag indicating that the first navigation data item is provided for the multiple reproduction paths, and wherein a flag is stored in the second navigation data item, the value of the flag indicating that the corresponding second navigation data item is provided for the single reproduction path wherein the navigation list file is separate from the map files and the stream files.

* * * * *